Aug. 21, 1934.  M. WAIDE  1,970,678
OPTICAL SYSTEM
Filed March 1, 1930
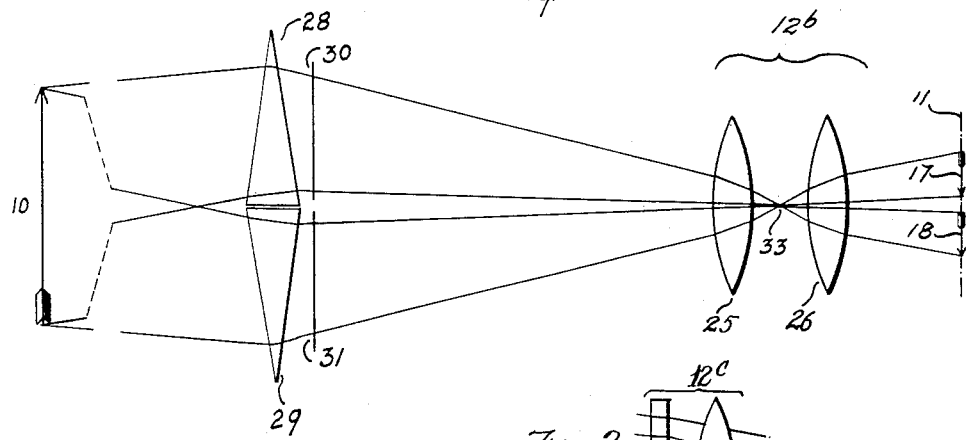
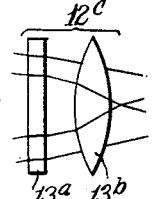
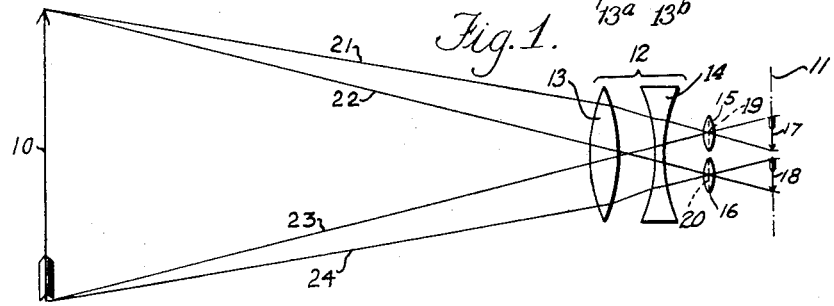
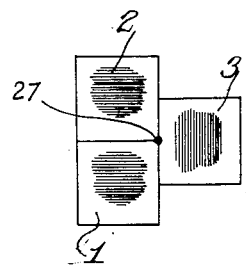
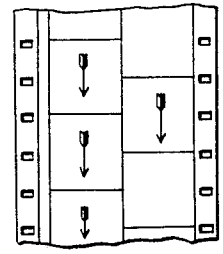
INVENTOR
MERRILL WAIDE
BY
Chester H. Braselton
ATTORNEY Patented Aug. 21, 1934

1,970,678

UNITED STATES PATENT OFFICE 1,970,678

OPTICAL SYSTEM

Merrill Waide, New York, N. Y., assignor to Natural-Color, Inc., New York, N. Y., a corporation of Delaware Application March 1, 1930, Serial No. 432,325

3 Claims. (Cl. 88—1)

This invention relates to an optical system which may be used in photography to produce a plurality of images of a single object upon a sensitized screen and in projection to produce a single composite image upon a screen from a plurality of photographic records.

Heretofore, in photographing an object in colors or to produce quasi stereoscopic effects there has been considerable difficulty in forming a plurality of images upon a sensitized screen and subsequently superimposing these images to form a single composite projection unless in the latter case the use of a multiple layer of dyed film with its necessary sacrifice of the quality of the image was acceptable. If in photography the rays from a single objective are split by refraction or reflection to form the three images necessary for natural color photography the effective aperture is divided thus causing a serious diminution of illumination. This is especially true at a short focus and in speed work, such as motion pictures, and especially where color filters are used. If the plurality of images formed are the result of adjacent objectives at different points of view then when such images are projected upon a screen at yet another distance serious faults, such as those associated with parallax, are found in the resultant picture.

It is one of the principal objects of this invention to provide an optical system to make use of substantially all of the light passing through a given effective aperture to form each of a plurality of images.

Another object of the invention is to simultaneously cause a plurality of images substantially alike geometrically to be formed upon a sensitized screen from a single object field and to permit the simultaneous superpositioning of such images to form a single composite image when the system is used in projection.

Another object of the invention is to provide an optical system which may be used in photography to form a plurality of images and which will permit photographing scenes at practically any distance without change of the position of the respective images on the film.

Another object of the invention is to provide an optical system which may be used in projection and which will permit operation at practically any screen distance with the images substantially superimposed upon the screen.

A further object of the invention is to provide an optical system having a relatively great depth of focus by reducing the parallax in photographing when using the major portion of the effective aperture of each of several adjacent objectives.

A still further object of the invention is to provide an optical system by which some quasi stereoscopic effect may be obtained.

Other objects of the invention are to provide an optical system in which sharpness of line may be obtained when optically superimposing a plurality of photographic records upon a screen, to obtain a cancellation of the visibility of the emulsion grain by the superimposing of a plurality of photographs, to obtain natural color images correct throughout the object field by use of the major portion of the effective aperture in an additive process, to permit greater range of values by the ability to use softer light, and to permit either visual or scale focusing by a well-known movement or device.

In the accompanying drawings which are optical diagrams showing the nature and relation of parts of a few of the possible embodiments of my invention and in which the same parts are designated by like reference characters:

Fig. 1 is a diagram showing the principal rays of light passing through an optical system arranged in accordance with one embodiment of my invention;

Fig. 2 is a still further modification of the system shown in Fig. 1;

Fig. 3 illustrates another embodiment of the construction shown in either of the preceding figures;

Fig. 4 is a front view of the prisms shown in Fig. 4; and

Fig. 5 is a front view of a moving picture film showing the three photographic records thereon.

While lenses of certain configuration are shown in the various diagrams and are illustrated as single lenses it is to be understood that any one of the lenses shown may be composed of several parts in order to correct any or all of the well-known errors found in lenses such as coma, abberation, astigmatism, etc. and no attempt has been made in these figures to illustrate these corrections which are well-known in the art.

The use of the invention will first be explained in connection with photography to make image records of an object upon a sensitized screen. Referring then more specifically to Fig. 1, an arrow 10 is illustrated as the object to be photographed. A sensitized screen 11 is adapted to receive the image or images of the arrow 10 in order to photographically record them thereupon. A combination 12 of lenses is placed between the object 10 and the sensitized screen 11 and comprises a convergent lens 13, nearest to the object 10, and a divergent lens 14 between the convergent lens and the screen 11. The lens combination 12 is spaced from the object 10 so that the object lies in the front focal plane thereof. A plurality of similar convergent lenses 15 and 16 are arranged between the lens combination 12 and the screen 11 and these lenses are placed substantially in the same plane and their function is to form a plurality of independent images 17 and 18 of the object 10 upon the sensitized screen 11. To do this they are positioned from the screen 11 a distance equal to their focal lengths respectively for the particular color of light refracted by each. The two lenses 15 and 16 are shown for convenience of illustration but it is to be understood that more lenses may be used to produce more images although to give the natural color effect three of these lenses have been found to be sufficient. These lenses may be arranged with their optical axes parallel to and surrounding the optical axis of lens combination 12.

The lens 15 may be provided with a color screen 19 and the lens 16 may be provided with another color screen 20 of a different color so that the images 17 and 18 will be colored correspondingly to the color screens 19 and 20 acting with the lenses 15 and 16. Where three lenses are used the primary colors red, blue-violet, and green may be used to form images of red, blue-violet, and green and these color screens may be positioned in accordance with well-known practice.

With the assembly of elements just described above all rays of light from any single point on the object 10 are brought into parallel relation by the lens combination 12 and these rays passing through the lenses 15 and 16 build up the two separate images 17 and 18 on the sensitive screen 11 forming separate images thereon substantially geometrically similar to the object 10. It is understood that only principal rays are shown for the sake of clarity but they indicate the position of images sufficiently for illustration. Thus the rays 21 and 22, indicated as emanating from the head of the arrow 10 and striking the lens 13 at different portions on the surface thereof, become parallel after passing through the two lenses 13 and 14 and strike the two lenses 15 and 16, the ray 21 being directed by the lens 15 to form the point of the arrowhead of the image 17 and the ray 22 being directed by the lens 16 to form the point of the arrowhead of the image 18. In like manner rays 23 and 24 from the feather of the arrow 10 strike the lens 13 at different points on the surface thereof and after passing through the lenses 13 and 14 are directed parallelly to each other so that they intercept the lenses 15 and 16 and are directed respectively by these lenses to form the tip of the feather on the images 17 and 18 respectively. It will be seen that if the lenses 15 and 16 have color screens 19 and 20 of different colors the corresponding images 17 and 18 will be colored accordingly. If the arrow 10 has for instance, a red head and a blue feather and the color screens 19 and 20 are red and blue respectively, the red head will appear in the image 17 while the blue feather will appear in the image 18. When positives of these two images are superimposed by reversing this system in a manner hereinafter described it will be evident that the arrow will appear in its proper colors in the projected image.

Although the rays between the lens combination 12 and the coplanar lenses 15 and 16 are parallel it is preferable that the lens combination be spaced from the coplanar lenses as little as practicable so as to avoid loss of light used in forming the images by its falling without the system.

In using this optical system for projection a light source is placed beyond the positive photographic record of images 17 and 18 which are formed on a transparent screen and exactly the reverse of what has already been described takes place. From corresponding points on the records of the two images 17 and 18 the rays strike the lenses 15 and 16 and are brought into parallel relation with each other and after passing through the lens combination 12 converge to a focus on a screen positioned at the focal plane of this lens combination thus forming the image 10 of the arrow.

When the system is used in a camera the coplanar lenses 15 and 16 are positioned with the film in the focal plane thereof and the lens combination 12 is then adjusted by moving the lenses 13 and 14 toward or away from each other. This changes the focal length of the lens combination 12 so that the object 10 may be brought into the front focal plane thereof. When this is done sharp clear images 17 and 18 of the object 10 will be produced on the screen 11 and the respective images are also mutually spaced in position on the screen at a constant distance from each other regardless of the distance of the object. In projection the combination lens 12 is set so that its focal point is on the screen upon which the object 10 is to be projected and the coplanar lenses are then moved toward or away from the film until the film is in the back focal plane of the lenses at which time the composite projected image of the object 10 will be properly defined and correctly reproduced.

Fig. 2 is a view in which the preferred form of the invention has been shown. The adjustable combination here serves also as the image-forming objective. In this case is shown a lens combination 12b comprising the converging lenses 25 and 26, but instead of using a plurality of coplanar lenses 15 and 16 the plurality of images are formed by using prisms acting in conjunction with said lenses 25 and 26. Thus, in order to form two images I provide a plurality of prisms 28 and 29, the prism 28 refracting the rays of light to form the image 18 and the prism 29 refracting the rays to form the image 17. Color screens 30 and 31 may be used adjacent the prisms 28 and 29 respectively or the prisms may be made of colored glass so as to give the proper color to the images 17 and 18. Any number of prisms may be used depending on the number of images desired but these prisms should preferably be so positioned that their bases contain the axis of the lens combination 12b and active faces of each prism have between them a plane perpendicular to the axis of the system, such plane having said relation to all of the prisms. The prisms are also arranged as closely as possible to each other and far enough from lenses 12b so that each prism will intercept all of the light required for its corresponding image and none of the light for any of the other images.

Where three prisms are used their positioning is indicated in Fig. 4. In this construction the base of each of the prisms 1, 2 and 3 falls on the line 27 which coincides with the axis of the lens combination 12b. As clearly indicated by the shading in this figure the angle of each of the prisms contains a plane perpendicular to line 27 and the intersection of the active faces of each is remote from line 27.

The refractive power of the prisms is such as to refract, in photography, light from the objects so that the lenses will form a plurality of images, and in projection, light from the plurality of photographs which has passed the lenses, so that the rays will form a single composite image on the screen at the front focal plane of the system.

All rays from the same point on the object striking the prism 28 are diverted to the same point on the image 18 and all rays from the same point on the object striking the prism 29 are diverted to the same point on the image 17. While the lens combination 12b has been illustrated in Fig. 2 it is to be understood that the lens combination 12 may also be used with this construction.

The focusing of the construction shown in Fig. 2 is effected by altering the separation between lenses 25 and 26 to make the power of the combination such that the prisms will function for a given distance of screen as described above then moving the entire combination until the image is sharp for said distance. The photographs and screen in projection will then lie in the conjugate focal planes of the combination and the power of the lens combination will be such that the prisms of the power used will superimpose the images upon the screen. In fact, in arrangement shown in Fig. 2, the system amounts to substantially an objective of alterable focal length owing to the alterable separation between its elements 25 and 26 acting in conjunction with the prisms 28 and 29 between the objective and the composite image. The rays are shown drawn through the optical centre 33 of the compound objective.

A modification of the construction in Fig. 2 is to use the prisms and convergent objective as shown and add an alterable lens combination of weak power as used in Fig. 1.

In all of these figures thus far described an adjustable lens combination is included. If in certain instances, I desire greater latitude in adjustment and superimposing I may replace either or both of the lenses of the lens combination 12, 12a, and 12b with the equivalent in cylindrical lenses active in mutually perpendicular planes and together having the same effect substantially as the lens or lenses replaced. Such a construction is illustrated in Fig. 3 in which the lens 13 of Fig. 1 has been replaced by lenses 13a and 13b which are cylindrical lenses positioned with optical axes at right angles to each other. Focusing of one of these cylindrical lenses independently causes a relative movement of the plurality of images in one direction while a focusing of the other causes a relative movement in a perpendicular direction. Rotation of each cylindrical lens gives yet another adjustment of the relative spacing of the images and means are provided for such rotation. Thus independent adjustment for two directions of the image plane is attained and yet there will be no substantial effect upon distortion or definition of the image.

In both of the Figures 1 and 2 the lens combinations 12 and 12b are formed of a plurality of lenses for the purpose of changing the focal length of the combination so that objects at different distances from the camera may be photographed or in projection the projecting device may be fixed at different distances from the screen. However, if the distance of the object or screen from the apparatus is fixed a single convergent lens having a focal length equal to that of the lens combinations may be used, but in that case, of course, there would be no adjustment of the lens, the whole apparatus having to be positioned at the proper distance from the object or screen.

While the use of color filters has been described other means of coloring might be resorted to as for instance, in projection by illuminating the photographs by dispersed light.

It will be evident from the above that I have provided a system which may be used in either photography or projection and which makes use of substantially all of the light falling upon the system from a given object field to form a plurality of images in photography, which images may be superimposed in projection to form a composite image. The formation of a plurality of images for the superimposing of these images is done optically with a minimum loss of light so that considerably less light is needed for either photography or projection. It will also be noted that the lens combination of the invention permits focusing and that in photography the images are automatically positioned when they are in focus so that photographs of distant or near objects may be successively projected without change of focus in projection after the projector has been focused on a given screen.

Any of the well-known means may be used for moving the lenses with respect to each other but as these are so common in the art I have not considered it necessary to illustrate them. Likewise I have not shown means for moving the entire system in the projector nor means for rotating the cylindrical lenses, all of which means may be suitably provided and are well-known.

It is obvious that variations may be made in the structure shown in the drawing without departing from the spirit of the invention and I do not, therefore, desire to limit myself to what has been shown and described except as such limitations occur in the appended claims.

What I claim is:

1. In an optical system a convergent lens having a focal length substantially equal to the front focal distance of said system, a second convergent lens having a focal length substantially equal to the other focal distance of said system, and having a common axis with said first mentioned lens, and a plurality of prisms spaced from said lenses having their bases coincidental with said axis, said lenses being adjustable with respect to each other and with respect to said prisms.

2. In an optical system a convergent lens having a focal length substantially equal to one focal distance of said system, a second convergent lens having a focal length substantially equal to the other focal distance of said system, and a plurality of prisms spaced from said lenses and having their bases coincidental with the axis of said lenses and their perpendicular faces in a common plane, and a colored filter adjacent each of said prisms, said lenses being adjustable with respect to each other and with respect to said prisms.

3. In an optical system a convergent lens having a focal length substantially equal to one focal distance of said system, a second convergent lens having a focal length substantially equal to the other focal distance of said system and having a common axis with said first mentioned lens, and a plurality of prisms spaced from said lenses having their bases coincidental with said axis, said lenses being adjustable with respect to each other and with respect to said prisms, and means to color differently the rays of light passing through said prisms.

MERRILL WAIDE.